US011308131B2

(12) United States Patent
Kazem et al.

(10) Patent No.: US 11,308,131 B2
(45) Date of Patent: Apr. 19, 2022

(54) COMBINING VISUALIZATIONS IN A BUSINESS ANALYTIC APPLICATION (71) Applicant: International Business Machines Corporation, Armonk, NY (US)

(72) Inventors: Firas Kazem, Kanata (CA); Linda Hillis, Ottawa (CA); Anthony Nicola Tasca, Ottawa (CA); Gongjin Zhang, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 16/880,201

(22) Filed: May 21, 2020

(65) Prior Publication Data
US 2021/0365480 A1  Nov. 25, 2021

(51) Int. Cl.
G06F 16/28      (2019.01)
G06F 17/18     (2006.01)
G06F 16/2455   (2019.01)

(52) U.S. Cl.
CPC ...... G06F 16/287 (2019.01); G06F 16/24556 (2019.01); G06F 17/18 (2013.01)

(58) Field of Classification Search
CPC .. G06F 16/287; G06F 16/24556; G06F 17/18; G06Q 10/06393; G06N 20/00
See application file for complete search history.

(56) References Cited

U.S. PATENT DOCUMENTS

| | | | |
|---|---|---|---|
| 7,644,361 B2 | 1/2010 | Wu | |
| 9,135,233 B2 | 9/2015 | Fan | |
| 10,089,120 B2 | 10/2018 | Baumecker | |
| 10,529,099 B2 | 1/2020 | Kumar | |
| 2007/0226640 A1* | 9/2007 | Holbrook | G06F 16/951 715/765 |
| 2011/0004609 A1* | 1/2011 | Chitiveli | G06F 16/353 707/759 |
| 2020/0081891 A1* | 3/2020 | Pal | G06F 16/248 |

FOREIGN PATENT DOCUMENTS

| | | |
|---|---|---|
| CN | 102937970 B2 | 2/2016 |
| EP | 3343403 A1 | 7/2018 |

OTHER PUBLICATIONS

Authors et. al., Disclosed Anonymously, "Visualization Recommendation System Using a Hybrid Machine Learning Approach", ip.com Prior Art Database Technical Disclosure,,IPCOM000260192D, Oct. 30, 2019, pp. 1-4.
Microsoft Docs, "Group visuals in Power BI Desktop reports", Mar. 9, 2020, pp. 1-6.
Peltier Technical Services, Inc., "Combining Different Chart Types into a Single Excel Chart", Accessed May 6, 2020,13 pages.

* cited by examiner

*Primary Examiner* — Cam Y T Truong
(74) *Attorney, Agent, or Firm* — Gilbert Harmon, Jr.

(57) ABSTRACT

In an approach to combining visualizations in a business analytic application, responsive to receiving a plurality of original visualizations from a user, one or more visualization groups are created. A strength score is calculated for each visualization group of the one or more visualization groups. Responsive to the strength score for each visualization group of the one or more visualization groups meeting a minimum threshold score, one or more recommended visualizations are generated, wherein the one or more recommended visualizations are combinations of the plurality of original visualizations. The one or more recommended visualizations are sent to the user.

17 Claims, 6 Drawing Sheets

COMBINING VISUALIZATIONS IN A BUSINESS ANALYTIC APPLICATION

BACKGROUND

The present invention relates generally to the field of producing a permanent visual presentation of output data, and more particularly to combining visualizations in a business analytic application.

Data visualization is the graphic representation of quantitative information. Visualization involves producing images that communicate relationships among the represented data to viewers of the images. This communication is accomplished by mapping data values into graphics to create the visualization. This mapping establishes how data values will be represented visually, determining how and to what extent a property of a graphic mark, such as size or color, will change to reflect changes in the value of a datum.

To communicate information clearly and efficiently, data visualization uses many tools, including statistical graphics, plots, and information graphics. Numerical data may be represented using dots, lines, or bars, to visually communicate a quantitative message. Effective visualization helps users analyze and understand the data much more easily than viewing the raw data itself. Visualization makes complex data more accessible and usable. Typically tables are used where users will look up a specific measurement, while charts of various types are used where users will look for patterns or relationships in the data.

SUMMARY

Embodiments of the present invention disclose a method, a computer program product, and a system for combining visualizations in a business analytic application. In one embodiment, responsive to receiving a plurality of original visualizations from a user, one or more visualization groups are created. A strength score is calculated for the one or more visualization groups. Responsive to the strength score for the one or more visualization groups meeting a minimum threshold score, one or more recommended visualizations are generated, wherein the one or more recommended visualizations are combinations of the plurality of original visualizations. The one or more recommended visualizations are sent to the user.

DETAILED DESCRIPTION

One of the most fundamental ways to cope with information overload in business analytics is to visualize the data. Basically, this means drawing the data as a graph, plotting it on a map, or even using data to create an interactive diagram. By mapping data visually, it is not only easier to digest and understand important information, it is easier to discover key patterns, significant trends and compelling correlations which may have otherwise been challenging to unveil. Some of the basic properties of visualizations are described below.

Users of business analytics tools create visualizations in dashboards and reports to explore data and communicate analytic findings to other users. A business dashboard is an information management tool that is used to track key performance indicators, metrics, and other data points relevant to a business, department, or specific process. Through the use of data visualizations, dashboards simplify complex data sets to provide users with at-a-glance awareness of current performance.

Most business analytic applications support tabs, which are user interface elements that allow the organization and navigation of related content at the same hierarchical level. In the context of these analytic applications, the terms rows and columns are defined as visualizations that align vertically (columns) or horizontally (rows). When visualizations in a business analytic application align either vertically or horizontally, and are the same size, the system can infer that they belong to the same implicit visual group.

Visualizations may be grouped together in a business analytic application. Grouped visualizations are treated as one entity when the user interacts with it (e.g., moving or resizing).

A drill-through sequence is the ability to link a source visualization (or group of visualizations) with a target visualization (or group of visualizations) whereby the user can interact with the source visualization to switch the view to that of the target visualization(s). For example, a 'Total Sales' visualization can have a drill-through sequence whereby the user can click on the drill-through icon to go to a different view (a different tab within the same dashboard or a different dashboard) showing the visualizations 'Sales by Product' and 'Sales by Region'.

Without guidance or expertise, users may create multiple charts to communicate similar or related ideas that is better represented in a single visualization. These charts duplicate data and may mislead or distract readers from comprehending the relationships in the data or the analytic findings of the creator of the charts. The present invention discovers related visualizations and combines them into a new visualization. The present invention focuses the intent, consolidates the findings, and simplifies the dashboards and reports of the user.

An example of the combination of two individual visualizations into one new, combined visualization is described in FIGS. 2a through 2c below.

Figure 1:
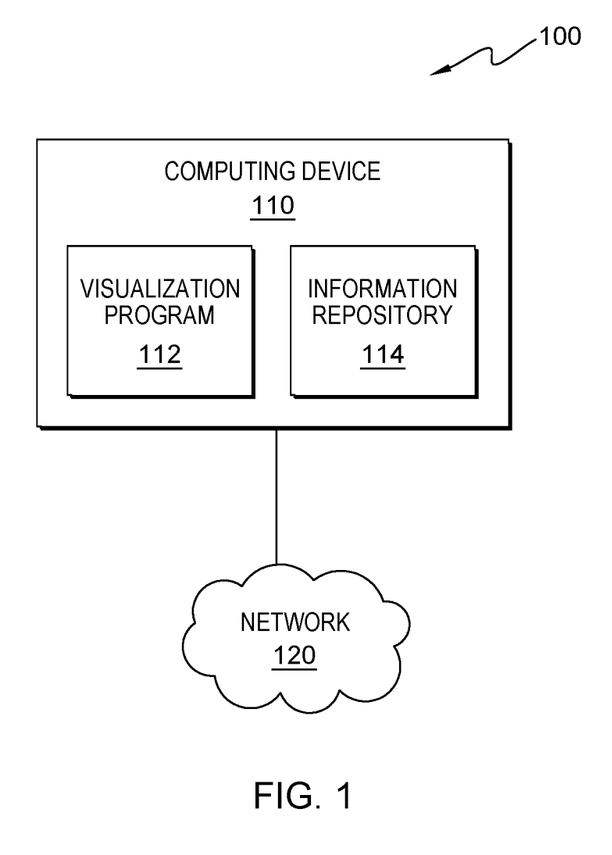
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of visualization program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes visualization program 112. In an embodiment, visualization program 112 is a program, application, or subprogram of a larger program for combining visualizations in a business analytic application. In an alternative embodiment, visualization program 112 may be located on any other device accessible by computing device 110 via network 120.

In an embodiment, computing device 110 includes information repository 114. In an embodiment, information repository 114 may be managed by visualization program 112. In an alternate embodiment, information repository 114 may be managed by the operating system of the device, alone, or together with, visualization program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, visualization data, raw data, user data, system configuration data, and other data that is received by visualization program 112 from one or more sources, and data that is created by visualization program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

Figure 2A:
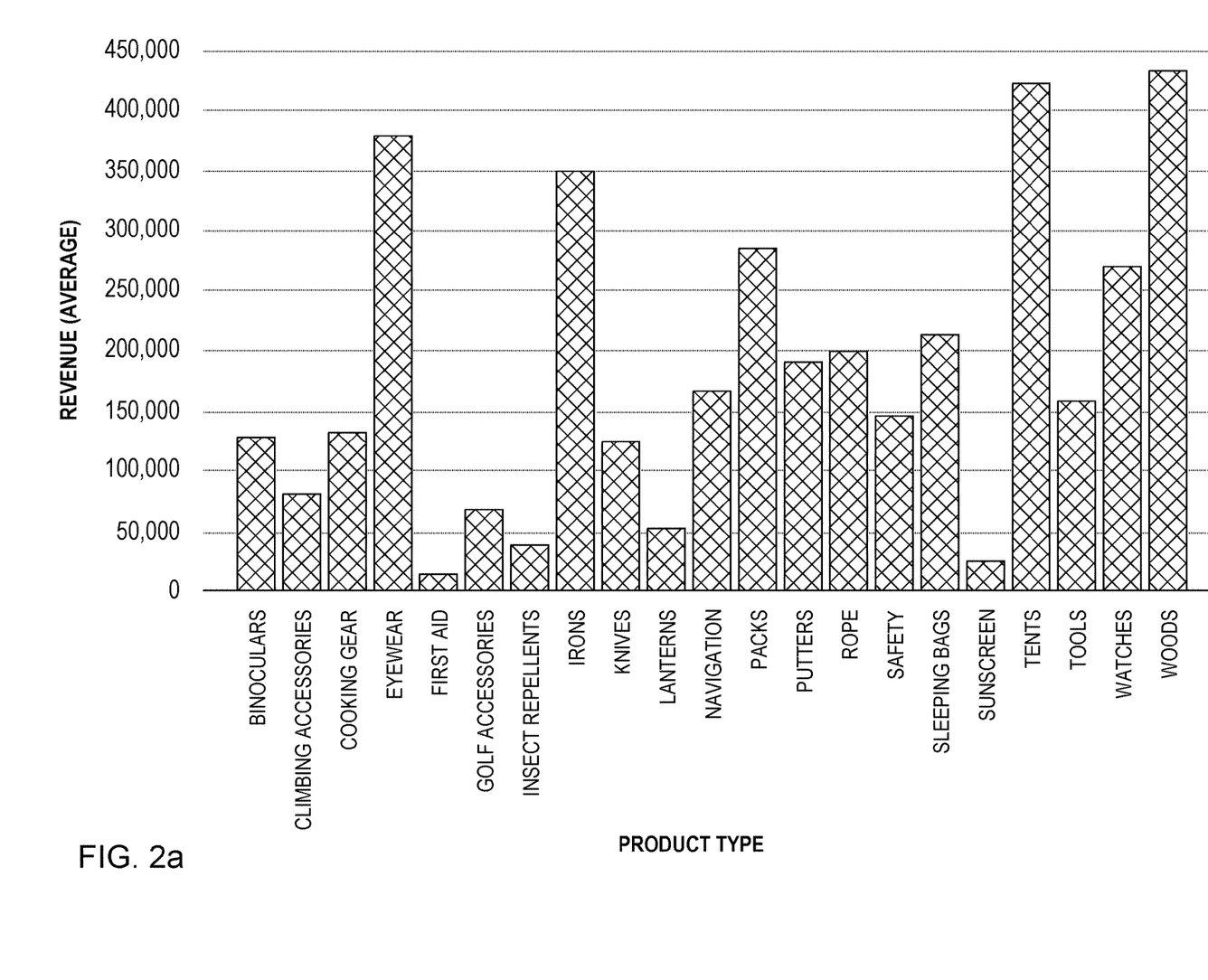
FIG. 2a is an example of a chart created by a user, in accordance with an embodiment of the present invention.
Figure 2B:
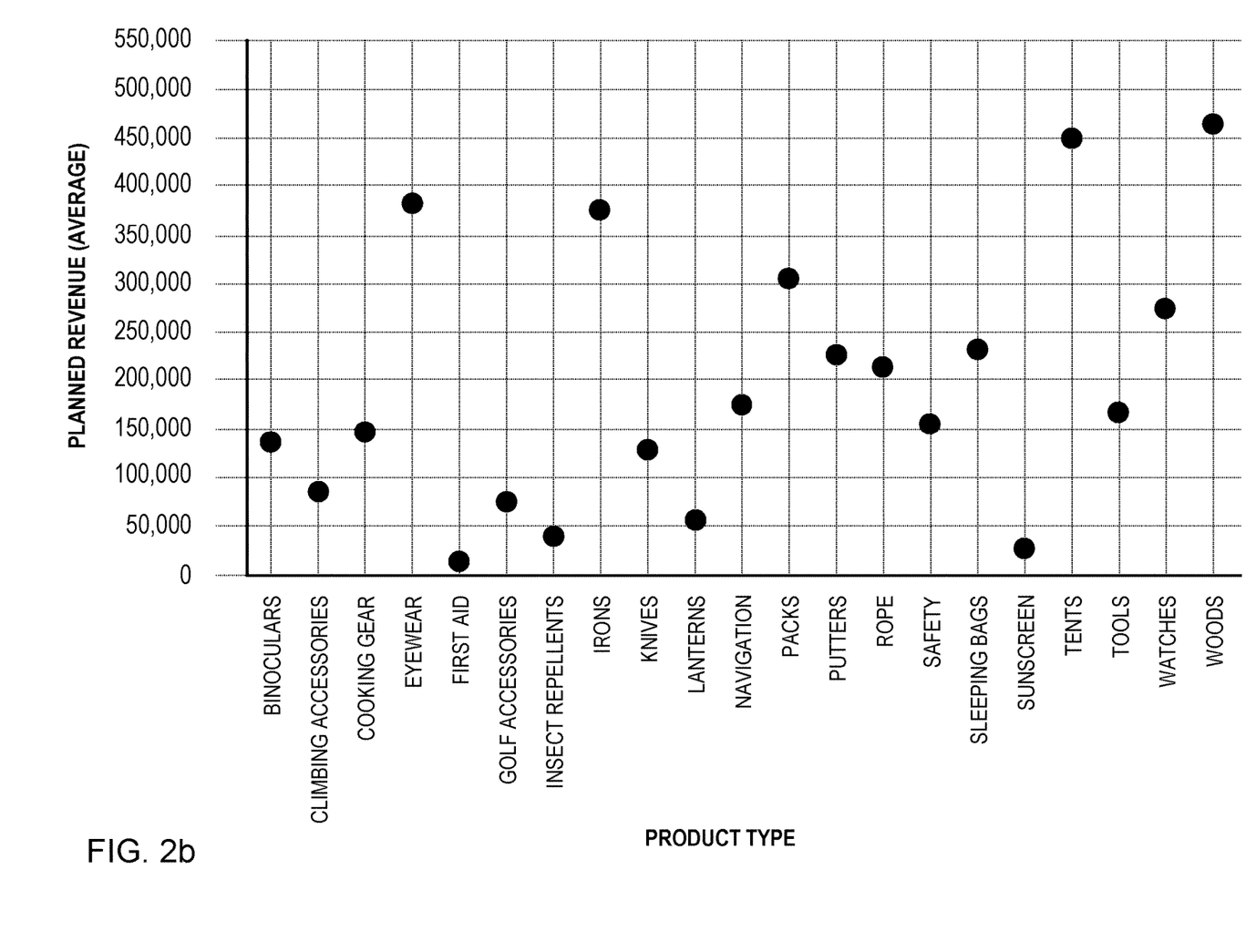
FIG. 2b is an example of a second chart created by a user, in accordance with an embodiment of the present invention.

FIGS. 2a and 2b are examples of two charts created previously by a user, typically with a business analytics program, in accordance with an embodiment of the invention. Chart 2a is a chart of revenue by product on the y-axis for each of the products listed on the x-axis. Chart 2b is a chart of planned revenue by product on the y-axis for each of the products listed on the x-axis, which are the same products as in Chart 2a.

Figure 2C:
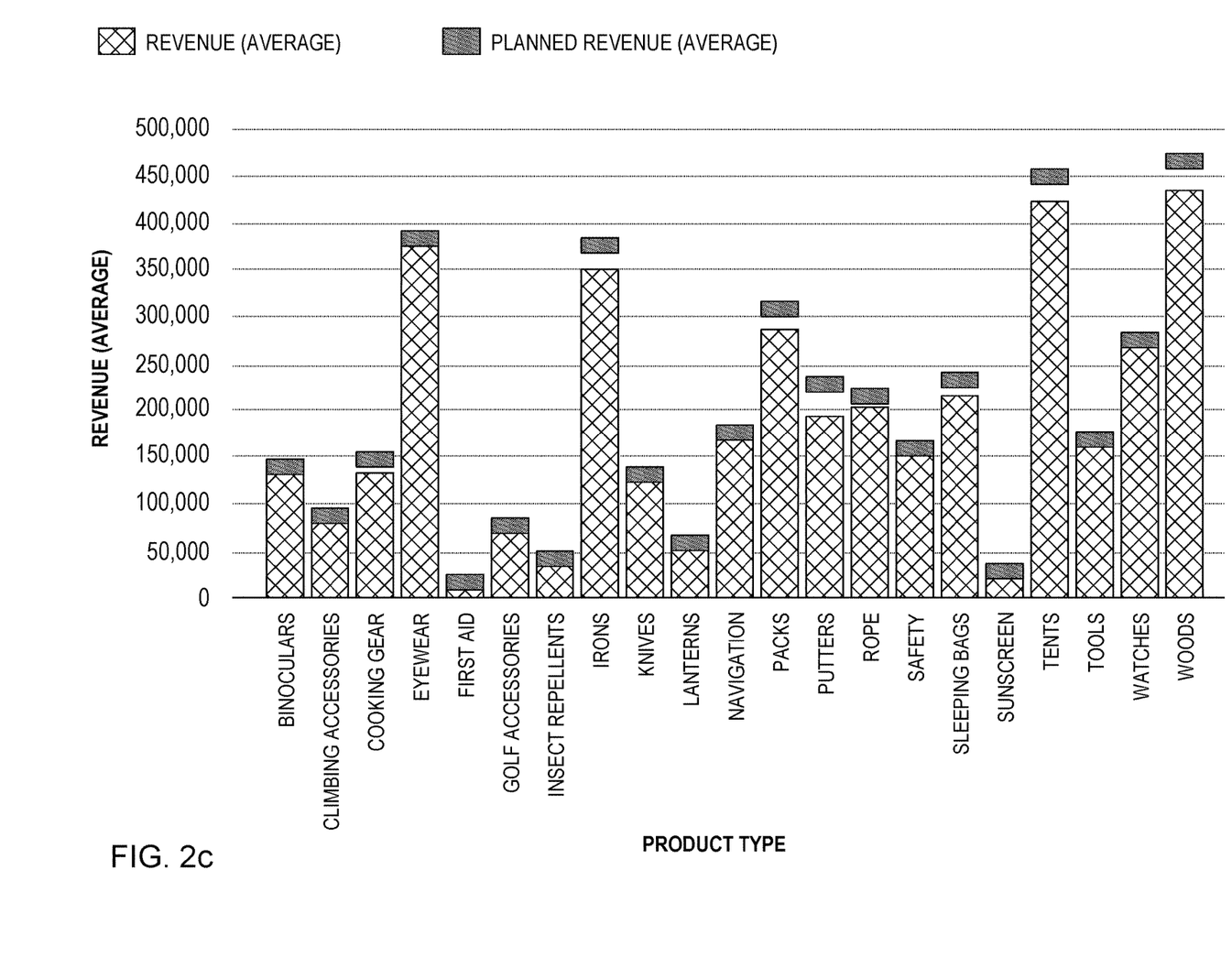
FIG. 2c is an example of a combined visualization created by the visualization program from the charts in FIGS. 2a and 2b, in accordance with an embodiment of the present invention.

FIG. 2c is an example of the combined visualization created by visualization program 112 from the two charts 2a and 2b. In chart 2c, the x-axis shows the same products as in charts 2a and 2b, but the y-axis has been combined to show both the revenue from chart 2a and the planned revenue from chart 2b. Here, visualization program 112 has determined that this chart meets the criteria for a combined visualization, as described below in FIG. 3, and created a new chart that shows the revenue as a bar in one color and overlays the planned revenue as a bar in a related color.

Figure 3:
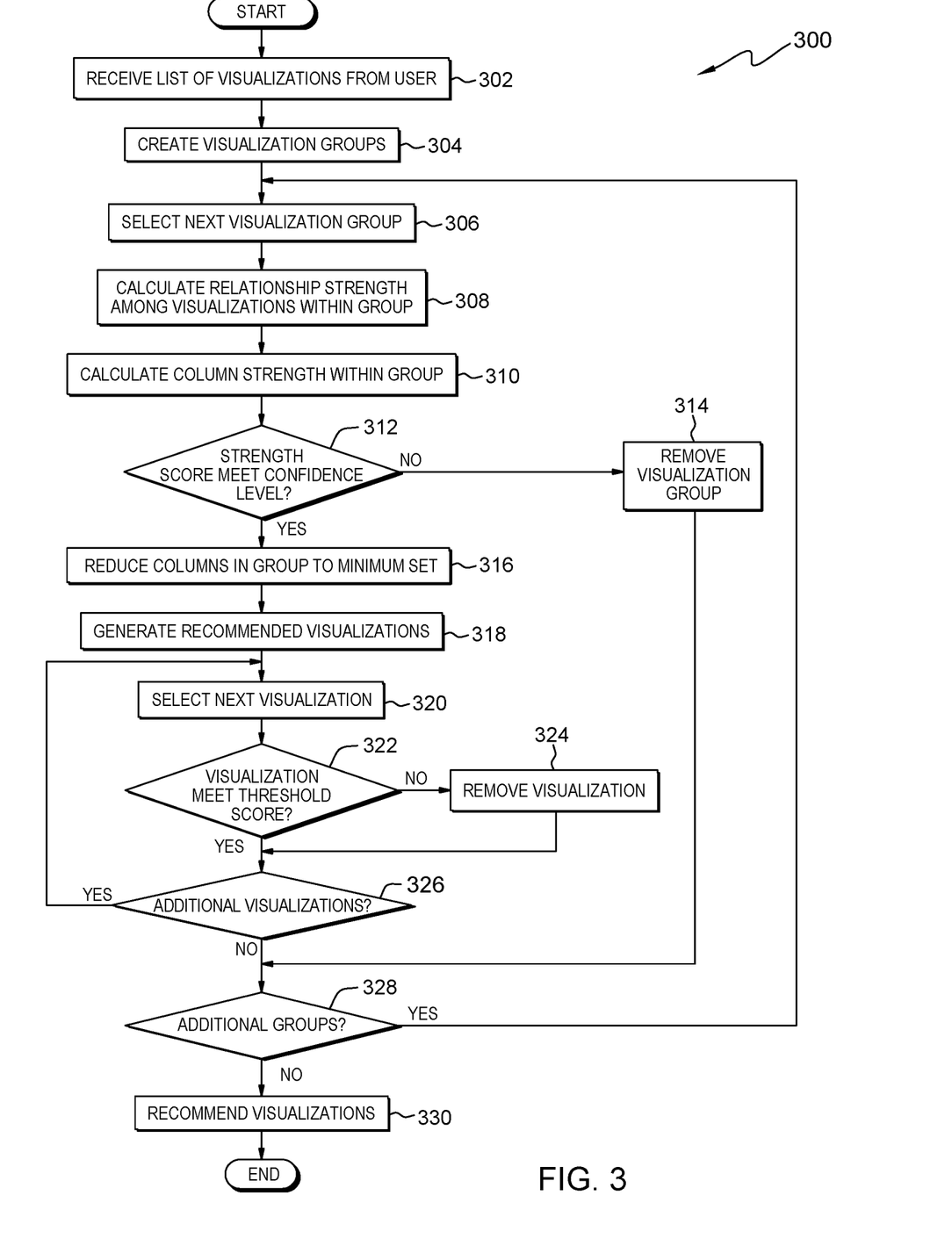
FIG. 3 is a flowchart depicting operational steps of the visualization program, on the distributed data processing environment of FIG. 1, in accordance with an embodiment of the present invention.

FIG. 3 is a flow chart diagram of workflow 300 depicting operational steps for visualization program 112 for combining visualizations in a business analytic application. In an alternative embodiment, the steps of workflow 300 may be performed by any other program while working with visualization program 112. In an embodiment, visualization program 112 receives a list of visualizations as candidates for combining from a user. In an embodiment, visualization program 112 generates all possible visualization combinations from the received list of visualizations with a size less than a threshold. In an embodiment, visualization program 112 selects one of the visualization groups. In an embodiment, visualization program 112 determines the strength of the relationship between the visualizations in the selected group. In an embodiment, visualization program 112 determines the strength of the relationship between the columns of each visualization in the selected group. In an embodiment, visualization program 112 determines the relationship strengths for the visualizations in the group, and combines the relationship strengths into an overall strength score for the group. In an embodiment, if visualization program 112 determines that the strength score for the group does not meet a confidence level, then visualization program 112 removes the selected group from consideration for combining. In an embodiment, visualization program 112 determines if the set of columns in the selected group can be reduced. In an embodiment, visualization program 112 determines a list of potential visualizations. In an embodiment, visualization program 112 determines if the recommended visualization meets a minimum threshold score. In an embodiment, if the visualization did not meet the minimum threshold score, visualization program 112 removes the visualization from consideration for recommendation. In an embodiment, visualization program 112 determines if there are any remaining visualization groups to analyze for possible combination. In an embodiment, if visualization program 112 determines that there are no remaining visualization groups to analyze for possible combination, then visualization program 112 sends the recommended visualizations to the user.

It should be appreciated that embodiments of the present invention provide at least for combining visualizations in a business analytic application. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Visualization program 112 receives a list of visualizations from a user (step 302). In an embodiment, visualization program 112 receives a list of visualizations created by a user in a business analytics program, for example, the charts in FIGS. 2a and 2b, as candidates for combining. Alternatively, visualization program 112 scans an entire business analytics application, for example, a dashboard or report, or a subset of the application, and determines possible combinations of visualizations to send a recommendation to the user.

Visualization program 112 creates visualization groups (step 304). In an embodiment, visualization program 112 generates all possible visualization combinations from the received list of visualizations with a group size of at least two visualizations, but less than a threshold number of visualizations (e.g., four visualizations per visualization group). The threshold may be a default value established during system initialization, or may be a value received from the user for a particular visualization combination procedure.

In an embodiment, possible combinations are generated for the received list of visualizations by creating the set of all subsets of the received list, where each subset has a minimum size of two visualizations, and a maximum size of the configured threshold. For example, if the received list of visualizations is {A, B, C} and the threshold for a visualization group is 3, then the possible visualization combinations are: {A, B}, {A, C}, {B, C}, and {A, B, C}.

Visualization program 112 selects the next visualization group (step 306). In an embodiment, visualization program 112 selects one of the visualization groups created in step 304 that has not yet been analyzed for possible combination.

Visualization program 112 calculates the relationship strength among visualizations within the group (step 308). In an embodiment, visualization program 112 calculates the strength of the relationship between the visualizations in the selected group. In an embodiment, the strength of the relationship between the visualizations in the selected group is a value between 0 and 1. In various embodiments, visualization program 112 uses the following criteria to determine the strength of the relationship between the visualizations in the selected group. In some embodiments, the criteria used by visualization program 112 is whether visualizations are part of an explicit visual layout group (e.g., part of the same tab or part of the same visual group in a tab). For example, in a multi-tab (or multi-page) business analytic application, visualizations that are on the same tab are part of an explicit visual layout group. In another example, visualizations that are grouped together explicitly by the user (group visualizations that are treated as a single object when moved or resized) are part of an explicit visual layout group.

In some embodiments, the criteria used by visualization program 112 is whether visualizations are part of an implicit visual group, such as those that share similar visual and layout attributes (e.g., visualizations that share a common color palette that is different from other color palettes in the same business analytic application, or visualizations that are of the same size and are aligned vertically or horizontally on the same row or column). In some embodiments, the criteria used by visualization program 112 is whether visualizations are part of the same connection group (i.e., visualizations are part of the same connection group when actions such as filtering will synchronize across all visualizations of the same group). In some embodiments, the criteria used by visualization program 112 is whether visualizations are part of the same drill-through sequence.

Visualization program 112 calculates the column strength within the group (step 310). In an embodiment, visualization program 112 calculates the strength of the relationship between the columns of each visualization in the selected group. In an embodiment, the strength of the relationship between the visualizations in the selected group is a value between 0 and 1. In various embodiments, visualization program 112 uses the following criteria to determine the strength of the relationship between the columns of each visualization in the selected group. In some embodiments, the criteria used by visualization program 112 is whether the columns are shared between the visualizations (e.g., all visualizations share a product column). In some embodiments, the criteria used by visualization program 112 is whether the concepts associated with the respective columns have comparable measures (e.g., planned revenue and revenue). In some embodiments, the criteria used by visualization program 112 is whether the concepts associated with the respective columns have an influential relationship (e.g., revenue influences margin).

As used herein, a concept is an ontological component that is used to represent data columns. For example, a data column with a header "City or Town", and data values "Toronto", "Paris", and "Berlin", is associated with the concept "City" automatically by a knowledge discovery system, or could be manually given that concept as additional metadata provided in the dataset.

In some embodiments, the criteria used by visualization program 112 is whether the concepts associated with the respective columns have a hierarchical relationship (e.g., product type and product). In some embodiments, the hierarchical relationship can include columns whose concepts form temporal hierarchies which results in high relationship strengths due to having comparable measures (e.g. quarter and year). In some embodiments, columns whose concepts form geographical hierarchies result in high relationship strengths due to the ease of combining those columns in map visualizations (e.g. city, state, and country).

In some embodiments, the criteria used by visualization program 112 is whether the respective columns differ in data manipulations such as statistics, filtering, top or bottom truncation, grouping, summary, aggregation, or other data manipulations (e.g., a column that is shared between two visualizations will have a lower relationship score when one of the visualizations applies filters to that column and the other one does not).

Visualization program 112 determines if the strength score for the group meets a confidence level (decision block 312). In an embodiment, visualization program 112 combines the relationship strengths and the column strengths into an overall strength score for the group. In an embodiment, visualization program 112 averages the relationship strengths and the column strengths into an overall strength score for the group. Visualization program 112 then determines if the strength score for the group meets a confidence level. The confidence level may be a default value established during system initialization, or may be a value received from the user for a particular visualization combination procedure. In an embodiment, if visualization program 112 determines that the strength score for the group does not meet a confidence level ("no" branch, decision block 312), then, then visualization program 112 proceeds to step 314.

In an embodiment, if visualization program 112 determines that the strength score for the group does meet a confidence level ("yes" branch, decision block 312), then visualization program 112 proceeds to step 316.

Visualization program 112 removes the visualization group (step 314). In an embodiment, if visualization program 112 determines that the strength score for the group does not meet a confidence level ("no" branch, decision block 312), then visualization program 112 removes the selected group from consideration for combining. Visualization program 112 then proceeds to decision block 328 to determine if there are additional groups to analyze.

Visualization program 112 reduces the columns in the group to a minimum set (step 316). In an embodiment, visualization program 112 determines if the set of columns in the selected group can be reduced. In various embodiments, visualization program 112 uses the following criteria to determine if the set of columns in the selected group can be reduced. In some embodiments, the criteria used by visualization program 112 is whether columns are repeated in the visualizations. In some embodiments, the criteria used by visualization program 112 is whether columns are summaries of other columns (e.g., a column that is associated with the concept 'Quarter' that is summarized to show its data in years would be redundant when there is already a year column that is associated with the concept 'Year'). In some embodiments, the criteria used by visualization program 112 is whether columns are calculations of other columns (e.g., a sale price column that is associated with the concept 'Sale Price' would be redundant and can be removed when there are columns associated with the concepts 'Profit' and 'Price' that together show the sale price). In an embodiment, visualization program 112 deletes the excess columns as determined in this step.

Visualization program 112 generates recommended visualizations (step 318). In an embodiment, visualization program 112 determines a list of potential visualizations based on the reduced set of columns from step 316. In an embodiment, visualization program 112 will calculate a compatibility score for the visualization based on the column to slot bindings given a set of columns. In an embodiment, the compatibility score is a value between 0 and 1. In some embodiments, the compatibility score is based on industry best practices, columns statistics and concepts, and previous user/collective preferences.

Visualization program 112 selects the next visualization (step 320). In an embodiment, visualization program 112 selects one of the visualizations generated in step 318 that has not yet been analyzed for possible recommendation.

Visualization program 112 determines if the visualization meets a threshold score (decision block 322). In an embodiment, visualization program 112 determines if the recommended visualization meets a minimum threshold score. In an embodiment, the minimum threshold score is a default value established during system initialization. In another embodiment, the minimum threshold score is a value received from the user for a particular visualization combination procedure. In yet another embodiment, the minimum threshold score is calculated based on the compatibility score of the columns of each visualization determined in step 318. For example, if the columns of visualization VisA have a compatibility score of 0.8, and columns of visualization VisB have a compatibility score of 0.7, then the minimum threshold score of the recommended combined visualization must be greater than 0.75, the average of the two compatibility scores.

If visualization program 112 determines that the recommended visualization does not meet the minimum threshold score ("no" branch, decision block 322), then visualization program 112 proceeds to step 324. If visualization program 112 determines that the recommended visualization does meet the minimum threshold score ("yes" branch, decision block 322), then visualization program 112 proceeds to decision block 326.

Visualization program 112 removes the visualization (step 324). In an embodiment, if the visualization did not meet the minimum threshold score in decision block 322, visualization program 112 removes the visualization group from consideration for combination.

Visualization program 112 determines if there are additional visualizations (decision block 326). In an embodiment, visualization program 112 determines if there are any remaining visualizations to analyze for possible recommendation. If visualization program 112 determines that there are visualizations to analyze for possible recommendation ("yes" branch, decision block 326), then visualization program 112 returns to step 320 to select the next visualization. If visualization program 112 determines that there are no remaining visualizations to analyze for possible recommendation ("no" branch, decision block 326), then visualization program 112 proceeds to decision block 328.

Visualization program 112 determines if there are additional groups (decision block 328). In an embodiment, visualization program 112 determines if there are any remaining visualization groups to analyze for possible combination. If visualization program 112 determines that there are remaining visualization groups to analyze for possible combination ("yes" branch, decision block 328), then visualization program 112 returns to step 306 to select the next group. If visualization program 112 determines that there are no remaining visualization groups to analyze for possible combination ("no" branch, decision block 328), then visualization program 112 proceeds to step 330.

Visualization program 112 recommends the visualizations (step 330). In an embodiment, if visualization program 112 determines that there are no remaining visualization groups to analyze for possible combination, then visualization program 112 sends the recommended visualizations for each visualization group to the user. If visualization program 112 determines that none of the recommended visualizations in a visualization group meet the minimum threshold score, then visualization program 112 sends a message to the user that no combinations are recommended for that visualization group.

In an embodiment, visualization program 112 recommends a subset of the visualizations that have passed the minimum threshold. For example, visualization program 112 ranks the visualizations by the scores and recommends the top three combined visualizations for a visualization group.

In another embodiment, visualization program 112 takes into account preferences received from the user to select a subset of visualizations to recommend. For example, if visualization program 112 received a preference from the user to create bar charts over column charts, then it will recommend bar charts over column charts when both exist in the list of available visualizations. In an embodiment, visualization program 112 learns the preferences of the user over time by monitoring the selections made by the user.

In yet another embodiment, visualization program 112 recommends a combined visualization based on the types of the charts in the visualization group. For example, if visualization program 112 combines two bar charts of a visualization group, it will recommend a stacked bar chart as the combined chart since this closely aligns with the chart types in the visualization group.

Figure 4:
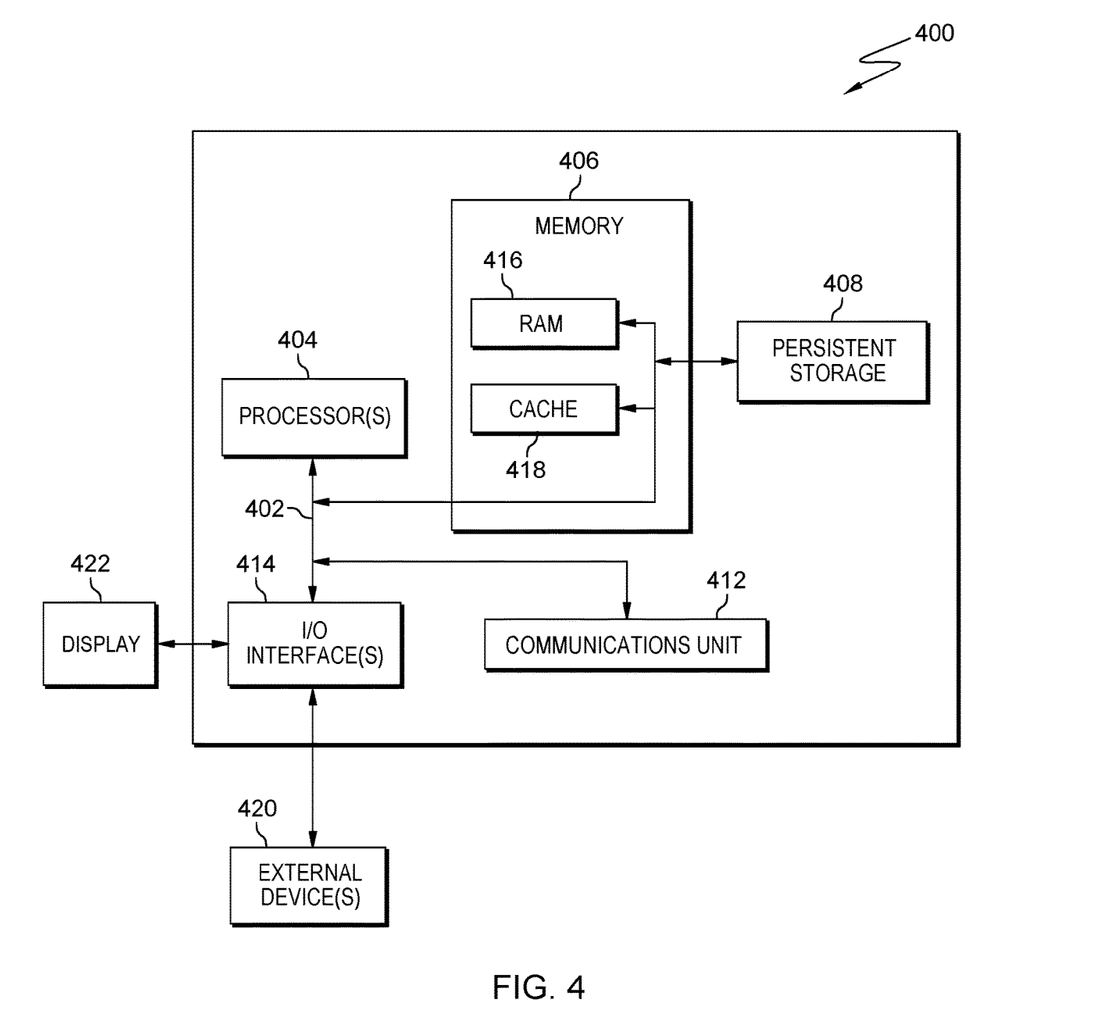
FIG. 4 depicts a block diagram of components of the computing device executing the visualization program within the distributed data processing environment of FIG. 1, in accordance with an embodiment of the present invention.

FIG. 4 is a block diagram depicting components of computing device 110 suitable for visualization program 112, in accordance with at least one embodiment of the invention. FIG. 4 displays the computer 400, one or more processor(s) 404 (including one or more computer processors), a communications fabric 402, a memory 406 including, a random-access memory (RAM) 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a RAM 416 and a cache 418. In general, the memory 406 can include any suitable volatile or non-volatile computer readable storage media. Cache 418 is a fast memory that enhances the performance of processor(s) 404 by holding recently accessed data, and near recently accessed data, from RAM 416.

Program instructions for visualization program 112 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allows for input and output of data with other devices that may be connected to computer 400. For example, the I/O interface(s) 414 may provide a connection to external device(s) 420 such as a keyboard, a keypad, a touch screen, a microphone, a digital camera, and/or some other suitable input device. External device(s) 420 can also include portable computer readable storage media such as, for example, thumb drives, portable optical or magnetic disks, and memory cards. Software and data used to practice embodiments of the present invention, e.g., visualization program 112, can be stored on such portable computer readable storage media and can be loaded onto persistent storage 408 via the I/O interface(s) 414. I/O interface(s) 414 also connect to a display 422.

Display 422 provides a mechanism to display data to a user and may be, for example, a computer monitor. Display 422 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for combining visualizations in a business analytic application, the computer-implemented method comprising:
    responsive to receiving a plurality of original visualizations from a user:
        creating, by one or more computer processors, one or more visualization groups in the business analytic application of a device; and
        calculating, by the one or more computer processors, a strength score for each visualization group of the one or more visualization groups comprising:
            calculating, by the one or more computer processors, a relationship strength score for said each visualization group of the one or more visualization groups;
            calculating, by the one or more computer processors, a column strength score for said each visualization group of the one or more visualization groups; and
            calculating, by the one or more computer processors, the strength score for said each visualization group of the one or more visualization groups based upon the relationship strength score and the column strength score;
        responsive to the strength score for said each visualization group of the one or more visualization groups meeting a minimum threshold score, generating, by the one or more computer processors, one or more recommended visualizations, wherein the one or more recommended visualizations are combinations of the plurality of original visualizations in the business analytic application; and sending, by the one or more computer processors, the one or more recommended visualizations to the user.

2. The computer-implemented method of claim 1, wherein calculating the relationship strength score for each visualization group of the one or more visualization groups further comprises determining, by the one or more computer processors, at least one of: whether one or more first visualizations of each visualization group of the one or more visualization groups are part of an explicit visual layout group, whether one or more second visualizations of each visualization group of the one or more visualization groups are part of an implicit visual group, whether one or more third visualizations of each visualization group of the one or more visualization groups are part of a same connection group, or whether one or more fourth visualizations of each visualization group of the one or more visualization groups are part of a same drill-through sequence.

3. The computer-implemented method of claim 1, wherein calculating the column strength score for each visualization group of the one or more visualization groups further comprises determining, by the one or more computer processors, at least one of: whether one or more first columns are shared between each visualization group of the one or more visualization groups, whether one or more second columns have comparable measures, whether one or more third columns have an influential relationship, whether one or more fourth columns have a hierarchical relationship, or whether one or more fifth columns differ in one or more data manipulations, wherein the one or more data manipulations include at least one of statistics, filtering, top or bottom truncation, grouping, summary, or aggregation.

4. The computer-implemented method of claim 1, wherein generating the one or more recommended visualizations comprises:

determining, by the one or more computer processors, whether one or more excess columns in each visualization group of the one or more visualization groups meeting the minimum threshold score can be reduced;

responsive to determining that the one or more excess columns in each visualization group of the one or more visualization groups meeting the minimum threshold score can be reduced, deleting, by the one or more computer processors, the one or more excess columns in each visualization group of the one or more visualization groups;

determining, by the one or more computer processors, a suitable visualization and a column to slot binding for each visualization group of the one or more visualization groups meeting the minimum threshold score; and recommending, by the one or more computer processors, the one or more recommended visualizations to the user, wherein the one or more recommended visualizations include the suitable visualization and the column to slot binding.

5. The computer-implemented method of claim 4, wherein determining that the one or more excess columns in each visualization group of the one or more visualization groups meeting the minimum threshold score can be reduced further comprises determining, by the one or more computer processors, at least one of: whether the one or more excess columns are repeated in each visualization group of the one or more visualization groups meeting the minimum threshold score, whether the one or more excess columns are summaries of other columns, or whether the one or more excess columns are calculations of other columns.

6. The computer-implemented method of claim 1, wherein the threshold is received from the user.

7. A computer program product for combining visualizations in a business analytic application, the computer program product comprising one or more computer readable storage media and program instructions stored on the one or more computer readable storage media, the program instructions including instructions to:

responsive to receiving a plurality of original visualizations from a user:
create one or more visualization groups in the business analytic application of a device; and
calculate a strength score for each visualization group of the one or more visualization groups comprising:
calculate a relationship strength score for said each visualization group of the one or more visualization groups;
calculate a column strength score for said each visualization group of the one or more visualization groups; and
calculate the strength score for said each visualization group of the one or more visualization groups based upon the relationship strength score and the column strength score;

responsive to the strength score for said each visualization group of the one or more visualization groups meeting a minimum threshold score, generate one or more recommended visualizations, wherein the one or more recommended visualizations are combinations of the plurality of original visualizations in the business analytic application; and send the one or more recommended visualizations to the user.

8. The computer program product of claim 7, wherein calculating the relationship strength score for each visualization group of the one or more visualization groups further comprises one or more of the program instructions, stored on the one or more computer readable storage media, to determine at least one of: whether one or more first visualizations of each visualization group of the one or more visualization groups are part of an explicit visual layout group, whether one or more second visualizations of each visualization group of the one or more visualization groups are part of an implicit visual group, whether one or more third visualizations of each visualization group of the one or more visualization groups are part of a same connection group, or whether one or more fourth visualizations of each visualization group of the one or more visualization groups are part of a same drill-through sequence.

9. The computer program product of claim 7, wherein calculating the column strength score for each visualization group of the one or more visualization groups further comprises one or more of the following program instructions, stored on the one or more computer readable storage media, to determine at least one of: whether one or more first columns are shared between each visualization group of the one or more visualization groups, whether one or more second columns have comparable measures, whether one or more third columns have an influential relationship, whether one or more fourth columns have a hierarchical relationship, or whether one or more fifth columns differ in one or more data manipulations, wherein the one or more data manipulations include at least one of statistics, filtering, top or bottom truncation, grouping, summary, or aggregation.

10. The computer program product of claim 7, wherein generating the one or more recommended visualizations comprises one or more of the following program instructions, stored on the one or more computer readable storage media, to:
- determine whether one or more excess columns in each visualization group of the one or more visualization groups meeting the minimum threshold score can be reduced;
- responsive to determining that the one or more excess columns in each visualization group of the one or more visualization groups meeting the minimum threshold score can be reduced, delete the one or more excess columns in each visualization group of the one or more visualization groups meeting the minimum threshold score;
- determine a suitable visualization and a column to slot binding for each visualization group of the one or more visualization groups meeting the minimum threshold score; and
- recommend the one or more recommended visualizations to the user, wherein the one or more recommended visualizations include the suitable visualization and the column to slot binding.

11. The computer program product of claim 10, wherein determining that the one or more excess columns in each visualization group of the one or more visualization groups meeting the minimum threshold score can be reduced further comprises one or more of the program instructions, stored on the one or more computer readable storage media, to determine at least one of: whether the one or more excess columns are repeated in each visualization group of the one or more visualization groups meeting the minimum threshold score, whether the one or more excess columns are summaries of other columns, or whether the one or more excess columns are calculations of other columns.

12. The computer program product of claim 7, wherein the threshold is received from the user.

13. A computer system for combining visualizations in a business analytic application, the computer system comprising:
- one or more computer processors;
- one or more computer readable storage media; and
- program instructions stored on the one or more computer readable storage media for execution by at least one of the one or more computer processors, the stored program instructions including instructions to:
- responsive to receiving a plurality of original visualizations from a user:
  - create one or more visualization groups in the business analytic application of a device; and
  - calculate a strength score for each visualization group of the one or more visualization groups comprising:
    - calculate a relationship strength score for said each visualization group of the one or more visualization groups;
    - calculate a column strength score for said each visualization group of the one or more visualization groups; and
    - calculate the strength score for said each visualization group of the one or more visualization groups based upon the relationship strength score and the column strength score;
- responsive to the strength score for said each visualization group of the one or more visualization groups meeting a minimum threshold score, generate one or more recommended visualizations, wherein the one or more recommended visualizations are combinations of the plurality of original visualizations in the business analytic application; and
- send the one or more recommended visualizations to the user.

14. The computer system of claim 13, wherein calculating the relationship strength score for each visualization group of the one or more visualization groups further comprises one or more of the program instructions, stored on the one or more computer readable storage media, to determine at least one of: whether one or more first visualizations of each visualization group of the one or more visualization groups are part of an explicit visual layout group, whether one or more second visualizations of each visualization group of the one or more visualization groups are part of an implicit visual group, whether one or more third visualizations of each visualization group of the one or more visualization groups are part of a same connection group, or whether one or more fourth visualizations of each visualization group of the one or more visualization groups are part of a same drill-through sequence.

15. The computer system of claim 13, wherein calculating the column strength score for each visualization group of the one or more visualization groups further comprises one or more of the program instructions, stored on the one or more computer readable storage media, to determine at least one of: whether one or more first columns are shared between each visualization group of the one or more visualization groups, whether one or more second columns have comparable measures, whether one or more third columns have an influential relationship, whether one or more fourth columns have a hierarchical relationship, or whether one or more fifth columns differ in one or more data manipulations, wherein the one or more data manipulations include at least one of statistics, filtering, top or bottom truncation, grouping, summary, or aggregation.

16. The computer system of claim 13, wherein generating the one or more recommended visualizations comprises one or more of the program instructions, stored on the one or more computer readable storage media, to: determine whether one or more excess columns in each visualization group of the one or more visualization groups meeting the minimum threshold score can be reduced; responsive to determining that the one or more excess columns in each visualization group of the one or more visualization groups meeting the minimum threshold score can be reduced, delete the one or more excess columns in each visualization group of the one or more visualization groups; determine a suitable visualization and a column to slot binding for each visualization group of the one or more visualization groups meeting the minimum threshold score; and recommend the one or more recommended visualizations to the user, wherein the one or more recommended visualizations include the suitable visualization and the column to slot binding.

17. The computer system of claim 16, wherein determining that the one or more excess columns in each visualization group of the one or more visualization groups meeting the minimum threshold score can be reduced further comprises one or more of the program instructions, stored on the one or more computer readable storage media, to determine at least one of: whether the one or more excess columns are repeated in each visualization group of the one or more visualization groups meeting the minimum threshold score, whether the one or more excess columns are summaries of other columns, or whether the one or more excess columns are calculations of other columns.

\* \* \* \* \*